(12) United States Patent
Homma et al.

(10) Patent No.: US 9,163,380 B2
(45) Date of Patent: Oct. 20, 2015

(54) HYDRAULIC EXCAVATOR

(71) Applicant: KOMATSU LTD., Tokyo (JP)

(72) Inventors: Takuya Homma, Hirakata (JP); Kozo Okuda, Hirakata (JP); Hiroto Shinomiya, Hirakata (JP)

(73) Assignee: KOMATSU LTD., Tokyo (JP)

( * ) Notice: Subject to any disclaimer, the term of this patent is extended or adjusted under 35 U.S.C. 154(b) by 150 days.

(21) Appl. No.: 14/124,868

(22) PCT Filed: Nov. 20, 2012

(86) PCT No.: PCT/JP2012/080014
§ 371 (c)(1),
(2) Date: Dec. 9, 2013

(87) PCT Pub. No.: WO2014/061171
PCT Pub. Date: Apr. 24, 2014

(65) Prior Publication Data
US 2015/0240447 A1 Aug. 27, 2015

(30) Foreign Application Priority Data
Oct. 16, 2012 (JP) .................................. 2012-228796

(51) Int. Cl.
*F01N 13/02* (2010.01)
*E02F 9/08* (2006.01)
*F01N 3/20* (2006.01)
(Continued)

(52) U.S. Cl.
CPC ............... *E02F 9/0866* (2013.01); *B60K 13/04* (2013.01); *F01N 3/021* (2013.01); *F01N 3/035* (2013.01); *F01N 3/2066* (2013.01);
(Continued)

(58) Field of Classification Search
CPC ... E02F 9/0866; B60K 13/04; F01N 13/1805; F01N 13/009; F01N 13/1816; F01N 3/035; F01N 2590/08
See application file for complete search history.

(56) References Cited

U.S. PATENT DOCUMENTS 8,418,448 B2 * 4/2013 Kamata et al. .................. 60/322
8,820,468 B2 * 9/2014 Sekiya ........................... 180/309
(Continued)

FOREIGN PATENT DOCUMENTS

JP 2012-97413 A 5/2012
WO 2011/152306 A1 12/2011

OTHER PUBLICATIONS

The Office Action for the corresponding Korean patent application No. 11 2014-7033750, issued on Apr. 14, 2015.
(Continued)

*Primary Examiner* — Katy A Ebner
*Assistant Examiner* — Emma K Frick
(74) *Attorney, Agent, or Firm* — Global IP Counselors, LLP

(57) ABSTRACT

A hydraulic excavator includes an engine, a rotating frame, a vehicle body frame, a diesel particulate filtering device, a selective catalytic reduction device and a connecting pipe. The rotating frame supports the engine. The vehicle body frame is provided in a standing manner on the rotating frame, and includes a plurality of column members. The a diesel particulate filtering device and the selective catalytic reduction device process exhaust from the engine, and are supported by the vehicle body frame. The connecting pipe has an extendable bellows part in at least a portion. The connecting pipe connects the engine and the diesel particulate filtering device. The bellows part is located further away from the engine as the bellows part inclines further downward.

10 Claims, 4 Drawing Sheets

(51) Int. Cl.
*F01N 3/021* (2006.01)
*B60K 13/04* (2006.01)
*F01N 3/035* (2006.01)
*F01N 13/18* (2010.01)
*F01N 13/00* (2010.01)

(52) U.S. Cl.
CPC ......... *F01N 13/009* (2014.06); *F01N 13/1816* (2013.01); *F01N 2590/08* (2013.01)

(56) References Cited

U.S. PATENT DOCUMENTS

| | | | |
|---|---|---|---|
| 8,931,585 B2 * | 1/2015 | Sakai et al. | 180/291 |
| 8,997,915 B2 * | 4/2015 | Hayashi et al. | 180/309 |
| 9,016,426 B2 * | 4/2015 | Himoto et al. | 180/296 |
| 9,033,095 B2 * | 5/2015 | Sakai et al. | 180/309 |
| 2011/0074150 A1 | 3/2011 | Drost et al. | |
| 2012/0247861 A1 * | 10/2012 | Mizuno et al. | 180/296 |
| 2013/0319787 A1 * | 12/2013 | Kobayashi et al. | 180/309 |
| 2014/0083791 A1 * | 3/2014 | Togo | 180/309 |
| 2014/0102823 A1 * | 4/2014 | Mori et al. | 180/309 |
| 2015/0075894 A1 * | 3/2015 | Kamimae et al. | 180/309 |

OTHER PUBLICATIONS

International Search Report for PCT/JP2012/080014, issued on Mar. 5, 2013.

* cited by examiner

HYDRAULIC EXCAVATOR

CROSS-REFERENCE TO RELATED APPLICATIONS

This application is a U.S. National stage application of International Application No. PCT/JP2012/080014, filed on Nov. 20, 2012. This U.S. National stage application claims priority under 35 U.S.C. §119(a) to Japanese Patent Application No. 2012-228796, filed in Japan on Oct. 16, 2012, the entire contents of which are hereby incorporated herein by reference.

BACKGROUND

1. Field of the Invention

The present invention relates to a hydraulic excavator.

2. Background Information

Hydraulic excavators are equipped with exhaust processing devices. An exhaust processing device for processing exhaust from an engine is connected to the engine through a connection pipe (exhaust pipe). The exhaust processing device includes a diesel particulate filtering device and a selective reduction catalytic converter. The diesel particulate filtering device reduces particulate matter in the exhaust. The selective reduction catalytic converter reduces nitrogen oxides (NOx) in the exhaust.

When the exhaust processing device is attached to the engine to be supported by the engine, a heavy object is arranged on the engine. Consequently, a load on a bracket for attaching the exhaust processing device to the engine becomes larger. The weight of the bracket increases when the size of the bracket is increased to strengthen the bracket.

Therefore, the exhaust processing device is preferably attached to a supporting object other than the engine. For example, in Japanese Laid-open Patent 2012-097413, a table is provided via supporting legs on an upper frame. The diesel particulate filtering device and a selective reduction catalytic converter are arranged on the upper surface of the table.

SUMMARY

When the exhaust processing device is supported by a supporting object other than the engine as described in the above Japanese Laid-open Patent 2012-097413, there is a possibility that the supporting object may deflect due to the weight of the exhaust processing device. As a result, installation inaccuracies occur when connecting the exhaust processing device and the engine. Consequently, connecting the engine and the exhaust processing device may become difficult.

Furthermore, as described in Japanese Laid-open Patent 2012-097413, when mounting the exhaust processing device to the supporting object which is arranged on the upper frame, the exhaust processing device is affected by vibration from the upper frame. Conversely, the connecting pipe for connecting the exhaust processing device and the engine is affected by vibrations from the engine. Consequently, a load acts upon the connection pipe due to the difference in the vibrations of the engine and the supporting object.

An object of the present invention is to provide a hydraulic excavator that can resolve difficulties when connecting the engine and the exhaust processing device and that can reduce a load on the connecting pipe due to vibration.

A hydraulic excavator according to a first aspect of the present invention includes an engine, a rotating frame, a vehicle body frame, a diesel particulate filtering device, a selective catalytic reduction device, and a connecting pipe. The rotating frame supports the engine. The vehicle body frame is provided in a standing manner on the rotating frame. The vehicle body frame includes a plurality of column members. The diesel particulate filtering device is supported by the vehicle body frame. The diesel particulate filtering device processes exhaust from the engine. The selective catalytic reduction device is supported by the vehicle body frame. The selective catalytic reduction device processes exhaust from the engine. The connecting pipe includes in at least a portion thereof a bellows part that is extendable. The connecting pipe connects the engine and the diesel particulate filtering device. The bellows part is located further away from the engine as the bellows part inclines further downward.

The hydraulic excavator according to a second aspect of the present invention is related to the hydraulic excavator of the first aspect, wherein the diesel particulate filtering device and the selective catalytic reduction device are arranged in a row in the vehicle width direction. The bellows part inclines downward in the vehicle width direction.

The hydraulic excavator according to a third aspect of the present invention is related to the hydraulic excavator of the second aspect, wherein at least a portion of the diesel particulate filtering device is located below the selective catalytic reduction device.

The hydraulic excavator according to a fourth aspect of the present invention is related to the hydraulic excavator of the third aspect, wherein the diesel particulate filtering device is located further away from the engine than the selective catalytic reduction device.

The hydraulic excavator according to a fifth aspect of the present invention is related to the hydraulic excavator of the fourth aspect, wherein, a connecting portion of the diesel particulate filtering device and the connecting pipe is located below the diesel particulate filtering device.

The hydraulic excavator according to a sixth aspect of the present invention is related to the hydraulic excavator of the first aspect, and further includes an exterior cover. The exterior cover is attached to the vehicle body frame.

The hydraulic excavator according to a seventh aspect of the present invention is related to the hydraulic excavator of the first aspect, wherein the connecting pipe includes a spherical joint.

The hydraulic excavator according to an eighth aspect of the present invention is related to the hydraulic excavator of the first aspect, and further includes a hydraulic pump. The hydraulic pump is driven by the engine. The bellows part is arranged above the hydraulic pump.

The hydraulic excavator according to a ninth aspect of the present invention is related to the hydraulic excavator of the first aspect, wherein at least a portion of the bellows part is located below a connecting portion of the connecting pipe and the engine.

The hydraulic excavator according to a tenth aspect of the present invention is related to the hydraulic excavator of the first aspect, wherein the vehicle body frame includes a beam member. The beam member is supported by a column member. The diesel particulate filtering device and the selective catalytic reduction device are supported by the beam member.

The hydraulic excavator according to an eleventh aspect of the present invention is related to the hydraulic excavator of the tenth aspect, wherein at least a portion of the connecting pipe is located below the beam member.

The hydraulic excavator according to a twelfth aspect of the present invention is related to the hydraulic excavator of the tenth or eleventh aspects, wherein the connecting pipe extends from a location above the beam member toward a location below the beam member.

The hydraulic excavator according to the first aspect of the present invention is able to absorb differences in vibration between the engine and the vehicle body frame due to the bellows part of the connecting pipe. Consequently, a load on the connecting pipe is reduced. Moreover, the length of the bellows part can be made longer since the bellows part is arranged obliquely. As a result, the ability to absorb vibration by the bellows part can be improved. Vibration in the horizontal direction and in the vertical direction can be effectively absorbed since the bellows part is arranged obliquely.

Further, by making the bellows part longer, installation inaccuracies that occur when connecting the diesel particulate filtering device and the engine can be absorbed even if the vehicle body frame deflects due to the weight of the diesel particulate filtering device. Consequently, complications that arise when connecting the engine and the diesel particulate filtering device can be resolved.

The bellows part of the hydraulic excavator according to the second aspect of the present invention can effectively absorb deviation of the diesel particulate filtering device in the vehicle width direction. As a result, loads on the connecting pipe can be reduced even if the diesel particulate filtering device shakes in the vehicle width direction due to the column member of the vehicle body frame bending in the vehicle width direction.

At least a portion of the diesel particulate filtering device in the hydraulic excavator according to the third aspect of the present invention is located below the selective catalytic reduction device. Consequently, a layout that allows the bellows part to be arranged obliquely can be easily realized.

The diesel particulate filtering device of the hydraulic excavator according to the fourth aspect of the present invention is located further away from the engine than the selective catalytic reduction device. Therefore, the lengths of the connecting pipe and the bellows part can be made longer. Consequently, the load on the connecting pipe due to vibration can be further reduced.

The connecting portion for the diesel particulate filtering device and the connecting pipe in the hydraulic excavator according to a fifth aspect of the present invention is located below the diesel particulate filtering device. As a result, the connecting pipe is less likely to cause interference with the diesel particulate filtering device when lifting the diesel particulate filtering device upward to remove the same from the vehicle. The diesel particulate filtering device can then be removed from the vehicle easily even if the connecting pipe is long. Consequently, maintenance of the diesel particulate filtering device can be improved.

The exterior cover of the hydraulic excavator according to the sixth aspect of the present invention is attached to the vehicle body frame. Specifically, the vehicle body frame includes the functions of supporting the exterior cover and supporting the diesel particulate filtering device and the selective catalytic reduction device.

The connecting pipe of the hydraulic excavator according to a seventh aspect of the present invention includes the spherical joint. Consequently, positioning of the connecting pipe and the diesel particulate filtering device is facilitated. Thus, maintenance of the diesel particulate filtering device can be improved.

The bellows part in the hydraulic excavator according to the eighth aspect of the present invention is arranged above the hydraulic pump. Therefore, a space between the diesel particulate filtering device and the hydraulic pump can be used for arranging the bellows part.

At least a portion of the bellows part in the hydraulic excavator according to the ninth aspect of the present invention is located below a connecting portion of the connecting pipe and the engine. As a result, the location of the bellows part can be kept low.

The diesel particulate filtering device and the selective catalytic reduction device in the hydraulic excavator according to the tenth aspect of the present invention are supported by the beam member. Therefore, freedom in arranging the diesel particulate filtering device and the selective catalytic reduction device in the horizontal direction is improved.

At least a portion of the connecting pipe in the hydraulic excavator according to the eleventh aspect of the present invention is located below the beam member. As a result, the diesel particulate filtering device and the selective catalytic reduction device can be arranged in a lower location. Consequently, enlargement of the hydraulic excavator can be suppressed.

The connecting pipe in the hydraulic excavator according to the twelfth aspect of the present invention extends from a location above the beam member toward a location below the beam member. As a result, the diesel particulate filtering device and the selective catalytic reduction device can be arranged in a lower location.

DETAILED DESCRIPTION OF EMBODIMENT(S)

Figure 1:
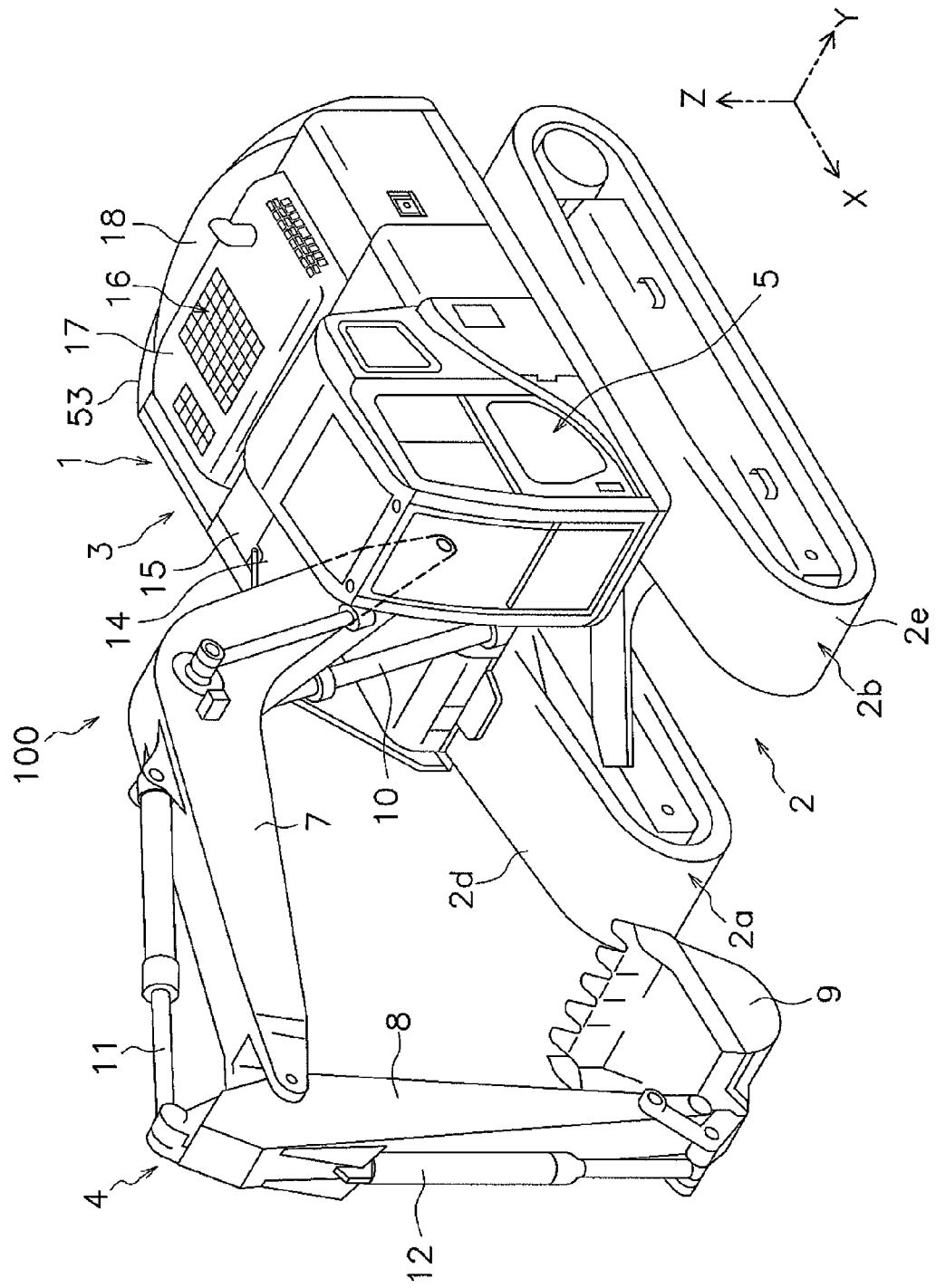
FIG. 1 is a perspective view of a hydraulic excavator according to an embodiment of the present invention.

FIG. 1 illustrates a hydraulic excavator 100 according to the embodiment of the present invention. The hydraulic excavator 100 is equipped with a vehicle body 1 and work implement 4.

The vehicle body 1 includes a travel unit 2 and a revolving unit 3. The travel unit 2 includes a pair of travel devices 2a, 2b. The travel devices 2a, 2b respectively include crawlers 2d, 2e. The travel devices 2a, 2b allow the hydraulic excavator 100 to travel due to the crawlers 2d, 2e being driven by driving power from a belowmentioned engine 21 (see FIG. 2).

A front-back direction in the following explanation signifies the front-back direction of the vehicle body 1. In other words, the front-back direction is the direction of the front and back as seen by an operator sitting in an operating cabin 5. The left and right direction or the lateral direction signifies the vehicle width direction of the vehicle body 1. In other words, the left and right direction, the vehicle width direction, or the lateral direction signifies a direction to the left and right of the above operator. In the drawings, the front-back direction is depicted as the X axis, the left and right direction is depicted as the Y axis, and the vertical direction is depicted as the Z axis.

The revolving unit 3 is mounted on the travel unit 2. The revolving unit 3 is provided in a rotatable manner with respect to the travel unit 2. The operating cabin 5 is provided in the revolving unit 3. The revolving unit 3 includes a fuel tank 14, a hydraulic fluid tank 15, an engine room 16, and a counterweight 18. The fuel tank 14 accommodates fuel for driving the belowmentioned engine 21. The fuel tank 14 is arranged in front of the hydraulic fluid tank 15. The hydraulic fluid tank 15 accommodates hydraulic fluid discharged from a belowmentioned hydraulic pump 23 (see FIG. 2). The hydraulic fluid tank 15 is arranged in a line in the front-back direction with the fuel tank 14.

The engine room 16 houses equipment such as the engine 21 and the hydraulic pump 23 as described below. The engine room 16 is arranged to the rear of the operating cabin 5, the fuel tank 14, and the hydraulic fluid tank 15. The top of the engine room 16 is covered by an engine hood 17. The counterweight 8 is arranged to the rear of the engine room 16.

The work implement 4 is attached in a front center location of the revolving unit 3. The work implement 4 includes a boom 7, an arm 8, a bucket 9, a boom cylinder 10, an arm cylinder 11, and a bucket cylinder 12. The proximal end of the boom 7 is coupled to the revolving unit 3 in a rotatable manner. The distal end of the boom 7 is coupled in a rotatable manner to the proximal end of the arm 8. The distal end of the arm 8 is coupled in a rotatable manner to the bucket 9. The boom cylinder 10, the arm cylinder 11, and the bucket cylinder 12 are driven by hydraulic fluid discharged from the belowmentioned hydraulic pump 23. The boom cylinder 10 actuates the boom 7. The arm cylinder 11 actuates the arm 8. The bucket cylinder 12 actuates the bucket 9. The work implement 4 is driven based on the cylinders 10, 11, 12 being driven.

Figure 2:
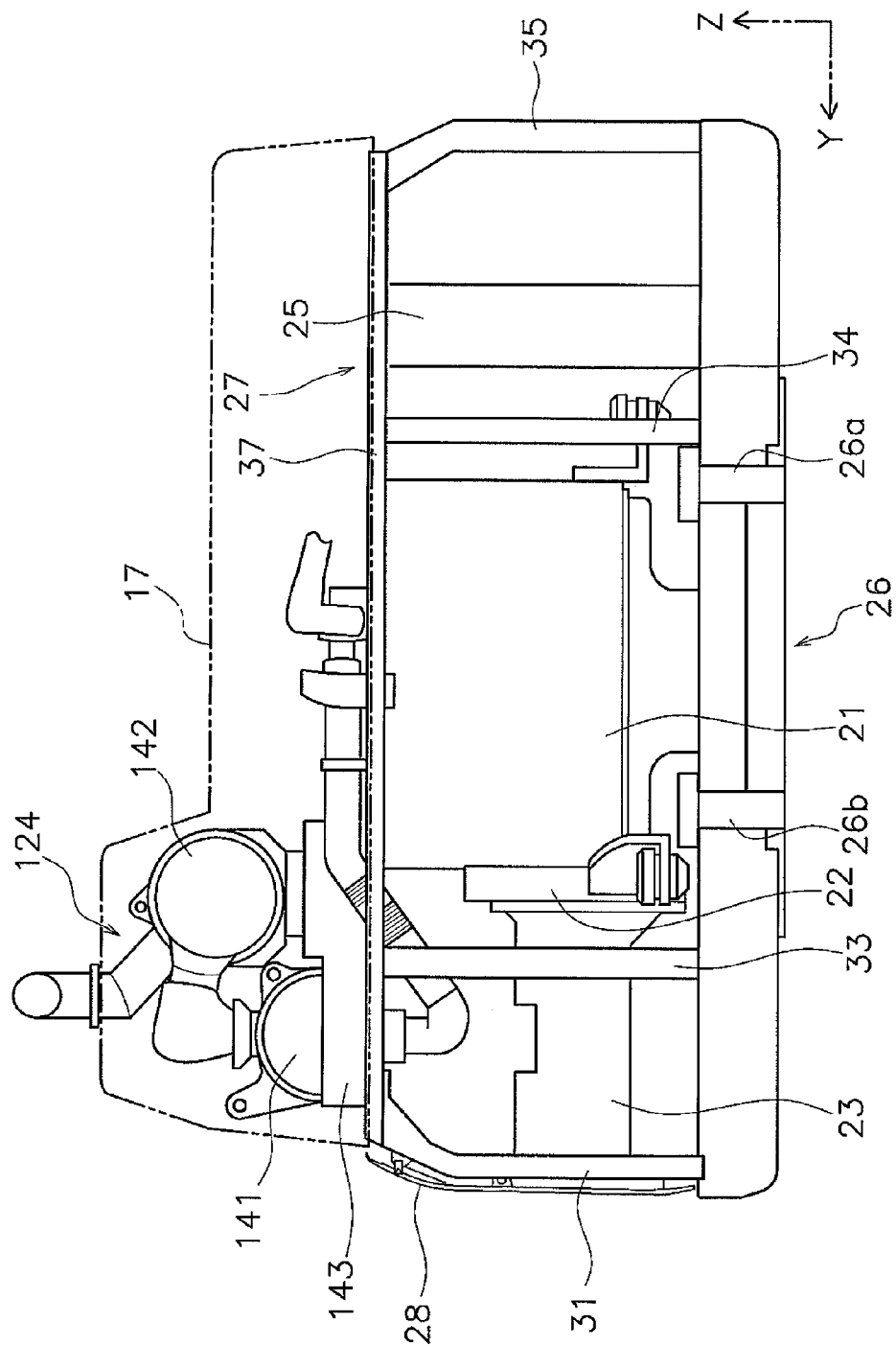
FIG. 2 illustrates an internal structure of an engine room as seen from the rear.
Figure 3:
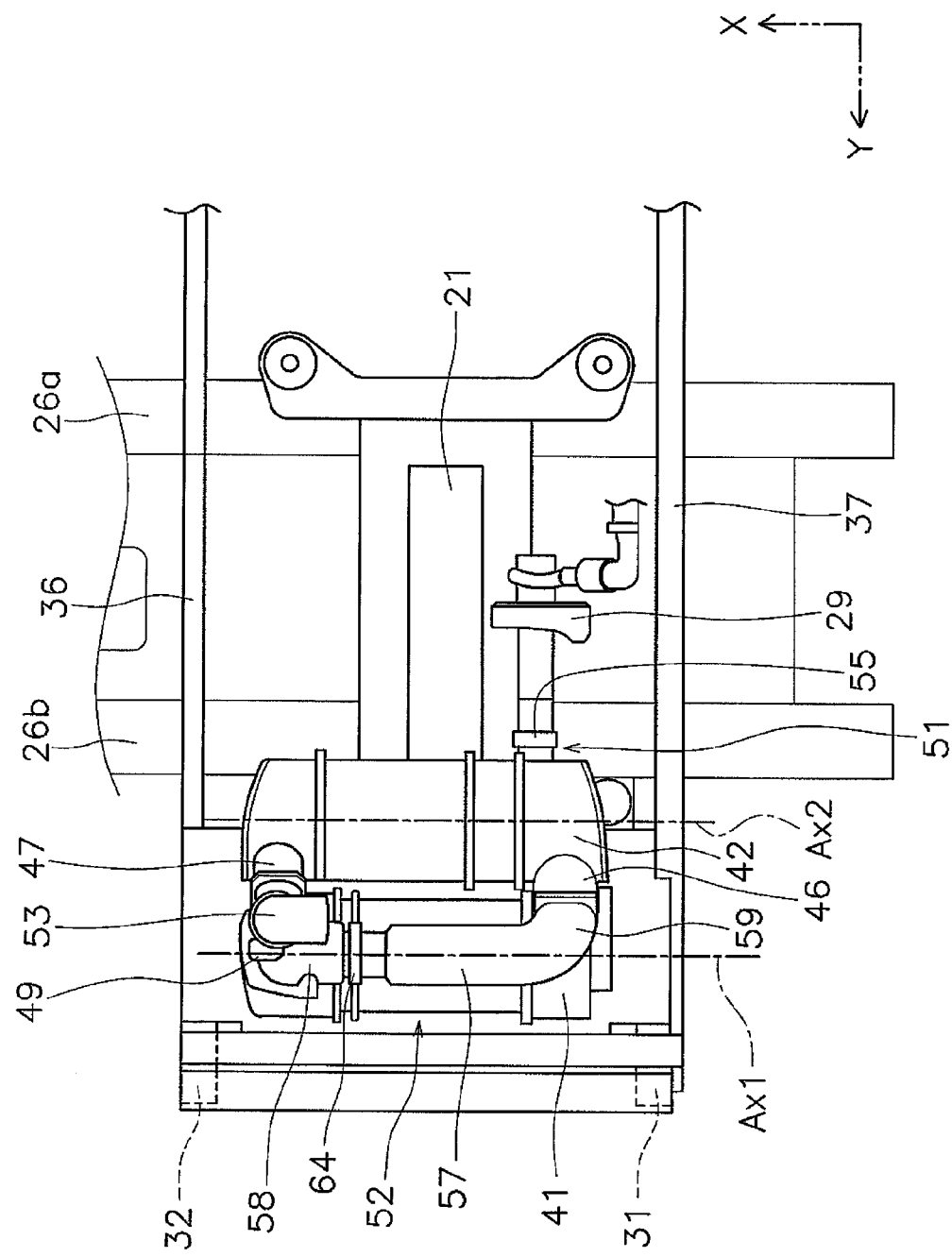
FIG. 3 is a top view the internal structure of the engine room.

FIG. 2 illustrates the internal structure of the engine room 16 as seen from the rear. FIG. 3 is a top view the internal structure of the engine room 16. As illustrated in FIG. 2, the engine 21, a flywheel housing 22, the hydraulic pump 23, and an exhaust processing unit 24 are arranged in the engine room 16. A cooling device 25 including a radiator and an oil cooler is arranged in the engine room 16. The cooling device 25, the engine 21, the flywheel housing 22, and the hydraulic pump 23 are arranged in a row in the vehicle width direction.

As illustrated in FIG. 2, the hydraulic excavator 100 includes the rotating frame 26 and the vehicle body frame 27. The rotating frame 26 includes a pair of center frames 26a, 26b that extend along the front-back direction. The rotating frame 26 supports the engine 21 via a rubber damper.

The vehicle body frame 27 is provided on the rotating frame 26 in a standing manner. The vehicle body frame 27 is arranged around equipment such as the engine 21 and the hydraulic pump 23 and the like. An exterior cover 28 is attached to the vehicle body frame 27. Only a portion of the exterior cover 28 is shown in FIG. 2. The engine hood 17 illustrated in FIG. 1 is also attached to the vehicle body frame 27.

As illustrated in FIGS. 2 and 3, the vehicle body frame 27 includes a plurality of column members 31 to 35 and a plurality of beam members 36, 37. The column members 31 to 35 are arranged to extend upwards from the rotating frame 26. The beam members 36, 37 are supported by the column members 31 to 35. Specifically, as illustrated in FIG. 3, the plurality of beam members 36, 37 include a first beam member 36 and a second beam member 37. The first beam member 36 and the second beam member 37 are arranged away from each other in the front-back direction. The first beam member 36 is arranged in front of the engine 21. The second beam member 36 is arranged behind the engine 21.

The hydraulic pump 23 is driven by the engine 21. As illustrated in FIG. 2, the hydraulic pump 23 is arranged beside the engine 21. Specifically, the hydraulic pump 23 is arranged in a row with the engine 21 in the vehicle width direction. The hydraulic pump 23 is arranged in a location below an upper surface of the engine 21.

The flywheel housing 22 is arranged between the engine 21 and the hydraulic pump 23. The flywheel housing 22 is attached to a side surface the engine 21. The hydraulic pump 23 is attached to a side surface the flywheel housing 22.

The exhaust processing unit 24 includes a diesel particulate filtering device 41, a selective catalytic reduction device 42, and a bracket 43. The exhaust processing unit 24 is arranged above the hydraulic pump 23. The exhaust processing unit 24 is arranged so as to cross between the first beam member 36 and the second beam member 37. The exhaust processing unit 24 is supported by the beam members 36, 37. Specifically, the diesel particulate filtering device 41 and the selective catalytic reduction device 42 are supported by the vehicle body frame 27.

The diesel particulate filtering device 41 is a device for processing exhaust from the engine 21. The diesel particulate filtering device 41 collects particulate matter included in the exhaust with a filter. The diesel particulate filtering device 41 burns the collected particulate matter with a heater provided with the filter.

The outer shape of the diesel particulate filtering device 41 is a roughly tubular shape. As illustrated in FIG. 3, a central axis Ax1 of the diesel particulate filtering device 41 is arranged along the front-back direction. Therefore, the central axis Ax1 of the diesel particulate filtering device 41 is arranged to be perpendicular to the direction in which the engine 21 and the hydraulic pump 23 are aligned. The central axis Ax1 of the diesel particulate filtering device 41 is arranged to be parallel to a central axis Ax2 of the selective catalytic reduction device 42.

Figure 4:
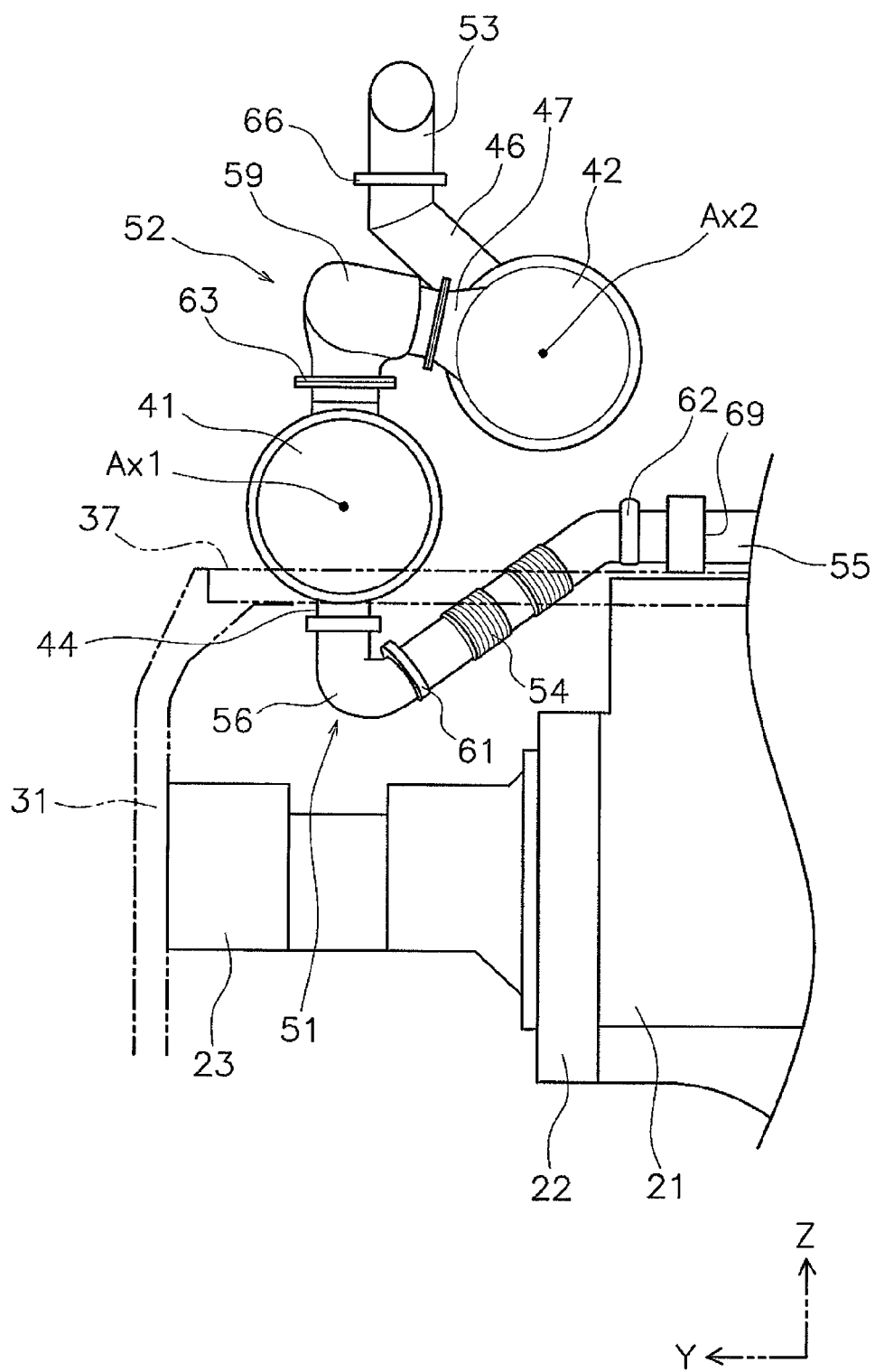
FIG. 4 illustrates a diesel particulate filtering device and a selective catalytic reduction device as seen from the rear.

FIG. 4 illustrates the diesel particulate filtering device 41 and the selective catalytic reduction device 42 as seen from the rear. Portions of the structure such as the bracket 43 are omitted in FIG. 4 to facilitate understanding. As illustrated in FIG. 4, the diesel particulate filtering device 41 is located further away from the engine 21 than the selective catalytic reduction device 42. The diesel particulate filtering device 41 and the selective catalytic reduction device 42 are arranged near each other. The diesel particulate filtering device 41 and the selective catalytic reduction device 42 are arranged in a row in the vehicle width direction in a state in which the respective longitudinal directions thereof are orthogonal to the vehicle width direction.

At least a portion of the diesel particulate filtering device 41 is located below the selective catalytic reduction device 42. Specifically, the top portion of the diesel particulate filtering device 41 is located below the top portion of the selective catalytic reduction device 42. The bottom portion of the diesel particulate filtering device 41 is located below the bottom portion of the selective catalytic reduction device 42. The top portion of the diesel particulate filtering device 41 is located above the beam members 36, 37. The bottom portion of the diesel particulate filtering device 41 is located at the same height as the beam members 36, 37. The diesel particulate filtering device 41 is arranged above the hydraulic pump 23.

The selective catalytic reduction device 42 is a device for processing exhaust from the engine 21. The selective catalytic reduction device 42 conducts hydrolysis of urea and selectively reduces nitrogen oxides NOx. The outer shape of the selective catalytic reduction device 42 is a roughly tubular shape. The central axis Ax2 of the selective catalytic reduction device 42 is arranged along the front-back direction. Therefore, the central axis Ax2 of the selective catalytic reduction device 42 is arranged to be perpendicular to the direction in which the engine 21 and the hydraulic pump 23 are aligned.

The selective catalytic reduction device 42 is arranged above the hydraulic pump 23. The bottom of the selective catalytic reduction device 42 is located above the upper surface of the engine 21. The bottom portion of the selective catalytic reduction device 42 is located above the beam members 36, 37. The bottom portion of the selective catalytic reduction device 42 is located below the top portion of the diesel particulate filtering device 41.

The diesel particulate filtering device 41 includes a first connection port 44. As illustrated in FIG. 4, the hydraulic excavator 100 includes a first connecting pipe 51. As illustrated in FIG. 3, one end of the first connecting pipe 51 is connected to an exhaust port of the engine 21 through a supercharger 29. As illustrated in FIG. 4, another end of the first connecting pipe 51 is connected to the first connection port 44 of the diesel particulate filtering device 41. Specifically, the first connecting pipe 51 couples the engine 21 and the diesel particulate filtering device 41.

The first connection port 44 is located in the bottom portion of the diesel particulate filtering device 41. Therefore, the connecting portion for the diesel particulate filtering device 41 and the first connecting pipe 51 is located below the diesel particulate filtering device 41. In the present embodiment, the connecting portion for the diesel particulate filtering device 41 and the first connecting pipe 51 is located directly below the diesel particulate filtering device 41. The first connecting pipe 51 extends from a location above the beam members 36, 37 toward a location below the beam members 36, 37. A portion of the first connecting pipe 51 is located below the beam members 36, 37.

As illustrated in FIG. 4, the first connecting pipe 51 includes an extendable bellows part 54. For example, the bellows part 54 is formed by coupling a plurality of bellow-shaped extendable joints. The bellows part 54 is arranged obliquely. Specifically, the bellows part 54 extends obliquely in the vehicle width direction and downward. The bellows part 54 inclines further away from the engine 21 as the bellows part 54 inclines further downward.

The bellows part 54 is arranged above the hydraulic pump 23. The bellows part 54 is located below the connecting portion of the first connecting pipe 51 and the engine 21. A portion of the bellows part 54 is located at the same height as the beam members 36, 37. A portion of the bellows part 54 is located below the selective catalytic reduction device 42. That is, the first connecting pipe 51 passes below the selective catalytic reduction device 42 to be connected to the diesel particulate filtering device 41. When the bellows part 54 is configured with the plurality of bellow-shaped extendable joints, the length of the bellows part 54 is the accumulative length of the bellow-shaped extendable joints.

The length of the first connecting pipe 51 in the vehicle width direction is greater than the distance between the center of the diesel particulate filtering device 41 in the vehicle width direction and the center of the selective catalytic reduction device 42 in the vehicle width direction. In other words, the length of the first connecting pipe 51 in the vehicle width direction is greater than the distance in the vehicle width direction between the central axis Ax1 of the diesel particulate filtering device 41 and the central axis Ax2 of the selective catalytic reduction device 42.

The length (path length) of the bellows part 54 is greater than the dimension of the diesel particulate filtering device 41 in the vehicle width direction. Specifically, the length of the bellows part 54 is greater than the diameter of the diesel particulate filtering device 41. The length of the bellows part 54 is greater than the dimension of the selective catalytic reduction device 42 in the vehicle width direction. Specifically, the length of the bellows part 54 is greater than the diameter of the selective catalytic reduction device 42.

The first connecting pipe 151 includes a linear section 55 and a bend section 56. The bend section 56 is connected to the first connection port 44. The bend section 56 couples the bellows part 54 and the first connection port 44. The bend section 56 is connected to the bellows part 54 through a spherical joint 61. A known technique disclosed in, for example, US 2011/0074150A1 may be used as the spherical joint 61.

As illustrated in FIG. 3, the linear section 55 couples the bellows part 54 and the engine 21. As illustrated in FIG. 4, the linear section 55 is connected to the bellows part 54 through a spherical joint 62. The linear section 55 includes a shrinkage joint 69. The shrinkage joint 69 is provided in an extendable manner in the axial direction, that is, the vehicle width direction, in the linear section 55.

The diesel particulate filtering device 41 includes a second connection port 45. The second connection port 45 is located at the top portion of the diesel particulate filtering device 41. The second connection port 45 projects upward. The selective catalytic reduction device 42 includes a third connection port 46. As illustrated in FIG. 4, the third connection port 46 is located at a side portion of the selective catalytic reduction device 42 toward the diesel particulate filtering device 41.

As illustrated in FIGS. 3 and 4, the exhaust processing unit 24 includes a second connecting pipe 52. One end of the second connecting pipe 52 is connected to the second connection port 45 of the diesel particulate filtering device 41. The other end of the second connecting pipe 52 is connected to the third connection port 46 of the selective catalytic reduction device 42. Specifically, the second connecting pipe 52 connects the diesel particulate filtering device 41 and the selective catalytic reduction device 42. The second connecting pipe 52 is located above the diesel particulate filtering device 41.

As illustrated in FIG. 3, the second connecting pipe 52 includes a linear section 57. The linear section 57 is located above the diesel particulate filtering device 41. The linear section 57 extends in a direction parallel to the central axis Ax2 of the selective catalytic reduction device 42. The second connecting pipe 52 includes a third bend section 58 and a fourth bend section 59.

As illustrated in FIG. 4, the third bend section 58 is connected to the second connection port 45 through a clamp 63. As illustrated in FIG. 3, the third bend section 58 is connected to the linear section 57 through a clamp 64. Therefore, the third bend section 58 couples the linear section 57 and the second connection port 45. The third bend section 58 is attached to a urea water injection device 49. The urea water injection device 49 injects urea into the second connecting pipe 52.

The fourth bend section 59 is connected to the linear section 57. The fourth bend section 59 is connected to the third connection port 46. Therefore, the fourth bend section 59 couples the linear section 57 and the third connection port 46.

As illustrated in FIG. 4, the selective catalytic reduction device 42 includes a fourth connection port 47. The fourth connection port 47 projects obliquely upward. Specifically, the fourth connection port 47 projects upward and obliquely toward the diesel particulate filtering device 41. The hydraulic excavator 100 includes a third connecting pipe 53. The third connecting pipe 53 is connected to the fourth connection port 47. The third connecting pipe 53 is located above the urea water injection device 49, and the fourth connection port 47 is arranged obliquely to avoid interfering with the third connecting pipe 53 and the urea water injection device 49. The top of the third connecting pipe 53 projects upward from the engine hood 17.

The engine 21, the first connecting pipe 51, the diesel particulate filtering device 41, the second connecting pipe 52, the selective catalytic reduction device 42, and the third connecting pipe 53 are connected serially in order. Therefore, the exhaust from the engine 21 passes through the first connecting pipe 51 and is fed to the diesel particulate filtering device 41. The diesel particulate filtering device 41 mainly reduces particulate matter in the exhaust. Next, the exhaust passes through the second connecting pipe 52 and is fed to the selective catalytic reduction device 42. NOx is mainly reduced in the selective catalytic reduction device 42. Next, the purified exhaust passes through the third connecting pipe 53 and is exhausted externally.

The bracket 43 illustrated in FIG. 2 couples the selective catalytic reduction device 42 and the diesel particulate filtering device 41. As a result, the diesel particulate filtering device 41, the selective catalytic reduction device 42, and the bracket 43 are formed in an integrated manner. The bracket 43 is fixed to the vehicle body frame 27. Consequently, the exhaust processing unit 24 is fixed to the vehicle body frame 27. The bracket 43 is attached to the vehicle body frame 27 in a detachable manner by a fixing means such as bolts. Therefore, the exhaust processing unit can be removed from the vehicle by removing the bracket 43 from the vehicle body frame 27.

The diesel particulate filtering device 41 can be removed from the vehicle by removing the diesel particulate filtering device 41 from the bracket 43. In this case, the first connecting pipe 51 is removed from the first connection port 44. The second connecting pipe 52 is removed from the second connection port 45. The diesel particulate filtering device 41 then is removed from the bracket 43. The diesel particulate filtering device 41 is then moved laterally in a slung state with a crane and the like. The diesel particulate filtering device 41 is then moved upward by hoisting. As a result, the diesel particulate filtering device 41 can be removed from the vehicle.

The hydraulic excavator 100 according to the present embodiment has the following features.

Since the first connecting pipe 51 has a bellows-like bellows part 54, the connection of the engine 21 and the diesel particulate filtering device 41 is facilitated. Moreover, the length of the bellows part 54 can be made longer since the bellows part 54 is arranged obliquely. As a result, connecting the engine 21 and the diesel particulate filtering device 41 is further facilitated.

Differences in vibration between the engine 21 and the vehicle body frame 27 can be absorbed by the bellows part 54 in the first connecting pipe 51. Consequently, a load on the first connecting pipe 51 is reduced. Moreover, the length of the bellows part 54 can be made longer since the bellows part 54 is arranged obliquely. As a result, the ability to absorb vibration by the bellows part 54 can be improved. Vibration in the vehicle width direction and in the vertical direction can be effectively absorbed since the bellows part 54 is arranged obliquely. Furthermore, a portion of the diesel particulate filtering device 41 is located below the selective catalytic reduction device 42. Consequently, a layout that allows the bellows part 54 to be arranged obliquely can be easily realized.

The diesel particulate filtering device 41 and the selective catalytic reduction device 42 are supported by a vehicle body frame 27. The diesel particulate filtering device 41 and the selective catalytic reduction device 42 can be supported without the use of a new member by using the previously provided vehicle body frame 27 to support the diesel particulate filtering device 41 and the selective catalytic reduction device 42. Consequently, material costs can be reduced.

The bellows part 54 is located further away from the engine 21 as the bellows part 54 inclines further downward. As a result, raising the location of the bellows part 54 can be reduced even if the bellows part 54 is made longer.

The diesel particulate filtering device 41 is located further away from the engine 21 than the selective catalytic reduction device 42. As a result, the length of the first connecting pipe 51 can be made longer. Therefore, the length of the bellows part 54 can be made longer. Consequently, the load on the first connecting pipe 51 due to vibration can be further reduced.

The connecting portion for the diesel particulate filtering device 41 and the first connecting pipe 51 is located directly below the diesel particulate filtering device 41. As a result, the diesel particulate filtering device 41 can be lifted upward to be easily removed from the vehicle without interference from the first connecting pipe 51.

The exterior cover 28 is attached to the vehicle body frame 27. Specifically, the vehicle body frame 27 includes the functions of supporting the exterior cover 28 and supporting the diesel particulate filtering device 41 and the selective catalytic reduction device 42.

The first connecting pipe 51 includes the spherical joint 61. Therefore, positioning of the first connecting pipe 51 and the diesel particulate filtering device 41 is facilitated. Consequently, maintenance of the diesel particulate filtering device 41 can be improved.

The bellows part 54 is arranged above the hydraulic pump 23. Therefore, a space between the diesel particulate filtering device 41 and the hydraulic pump 23 can be used for arranging the bellows part 54.

A portion of the bellows part 54 is located below the connecting portion of the first connecting pipe 51 and the engine 21. As a result, the location of the bellows part 54 can be kept low.

The diesel particulate filtering device 41 and a selective catalytic reduction device 42 are supported by the beam members 36, 37. Therefore, freedom in arranging the diesel particulate filtering device 41 and the selective catalytic reduction device 42 in the horizontal direction is improved.

At least a portion of the first connecting pipe 51 is located below the beam members 36, 37. As a result, the diesel particulate filtering device 41 and the selective catalytic reduction device 42 can be arranged in a lower location. Consequently, enlargement of the hydraulic excavator 100 can be suppressed.

The first connecting pipe 51 extends from a location above the beam members 36, 37 toward a location below the beam members 36, 37. As a result, the diesel particulate filtering device 41 and the selective catalytic reduction device 42 can be arranged in a lower location.

Although an embodiment of the present invention has been described so far, the present invention is not limited to the above embodiments and various modifications may be made within the scope of the invention.

The diesel particulate filtering device 41 may be located nearer the engine 21 than the selective catalytic reduction device 42. The entire diesel particulate filtering device 41 may be arranged below the selective catalytic reduction device 42. A portion of the selective catalytic reduction device 42 may be arranged below the beam members 36, 37.

The diesel particulate filtering device 41 is not limited to a tubular shape and may have any shape such as an oval shape or a rectangular shape. The selective catalytic reduction device is not limited to a tubular shape and may have any shape such as an oval shape or a rectangular shape.

The diesel particulate filtering device 41 and a selective catalytic reduction device 42 may be arranged in a row in a direction different from the vehicle width direction. For example, the diesel particulate filtering device 41 and the selective catalytic reduction device 42 may be arranged in the front-back direction of the vehicle.

The diesel particulate filtering device 41 may be supported by any of the column members 31 to 35. The selective catalytic reduction device 42 may be supported by any of the column members 31 to 35. The vehicle body frame 27 that supports the diesel particulate filtering device 41 and the selective catalytic reduction device 42 is not limited to supporting the exterior cover 28. For example, a dedicated vehicle body frame for supporting the diesel particulate filtering device 41 and the selective catalytic reduction device 42 may be provided.

A portion or all of the spherical joints included in the first connecting pipe 51, the second connecting pipe 52, and the third connecting pipe 53 may be omitted. However, spherical joints are preferably provided to facilitate positioning of the connecting pipes.

The bellows part 54 may be provided for the entire first connecting pipe 51 instead of a portion of the first connecting pipe 51. The length of the bellows part 54 may be greater than the length described above. Alternatively, the length of the bellows part 54 may be smaller than the length described above. However, the length of the bellows part 54 is preferably greater to improve the vibration absorption capability.

INDUSTRIAL APPLICABILITY

According to the present invention, a hydraulic excavator that can resolve difficulties when connecting the engine and the exhaust processing device and that can reduce a load on the connecting pipes due to vibration can be provided.

What is claimed is:
1. A hydraulic excavator comprising:
an engine;
a rotating frame configured to support the engine;
a vehicle body frame provided in a standing manner on the rotating frame, the vehicle body frame including a plurality of column members;
a diesel particulate filtering device configured to process exhaust from the engine, the diesel particulate filtering device being supported by the vehicle body frame;
a selective catalytic reduction device configured to process exhaust from the engine, the selective catalytic reduction device being supported by the vehicle body frame; and
a connecting pipe having an extendable bellows part in at least a portion thereof, the connecting pipe connecting the engine and the diesel particulate filtering device,
the bellows part being located further away from the engine as the bellows part inclines further downward,
the diesel particulate filtering device and the selective catalytic reduction device being arranged in a row along a vehicle width direction,
the bellows part inclining downward in the vehicle width direction,
at least a portion of the diesel particulate filtering device being located below the selective catalytic reduction device,
the diesel particulate filtering device being located further away from the engine than the selective catalytic reduction device, and
a connecting portion used to connect the diesel particulate filtering device and the connecting pipe being located below the diesel particulate filtering device.
2. The hydraulic excavator according to claim 1, wherein a portion of the inclined bellows part is located below the selective catalytic reduction device.
3. The hydraulic excavator according to claim 1, further comprising:
an external cover attached to the vehicle body frame.
4. The hydraulic excavator according to claim 1, wherein the connecting pipe includes a spherical joint.
5. The hydraulic excavator according to claim 1, further comprising:
a hydraulic pump driven by the engine,
the bellows part being arranged above the hydraulic pump.
6. The hydraulic excavator according to claim 1, wherein at least a portion of the bellows part is located below a connecting portion of the connecting pipe and the engine.
7. The hydraulic excavator according to claim 1, wherein the vehicle body frame includes a beam member supported by the column member; and
the diesel particulate filtering device and the selective catalytic reduction device are supported by the beam member.
8. The hydraulic excavator according to claim 7, wherein at least a portion of the connecting pipe is located below the beam member.
9. The hydraulic excavator according to claim 8, wherein the connecting pipe extends from a location above the beam member toward a location below the beam member.
10. The hydraulic excavator according to claim 7, wherein the connecting pipe extends from a location above the beam member toward a location below the beam member.

* * * * *